March 20, 1934.　　W. A. SONNETT　　1,951,565
VALVE
Filed June 20, 1932
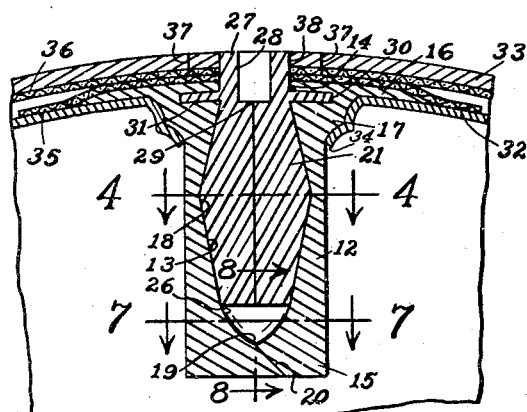
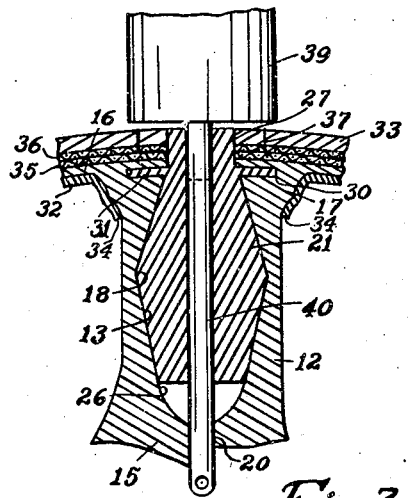
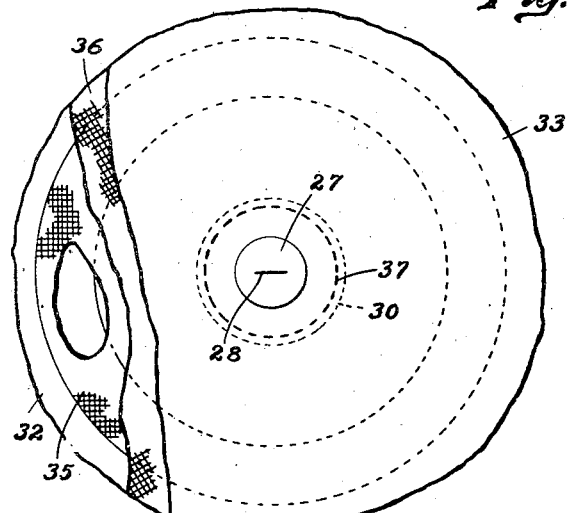
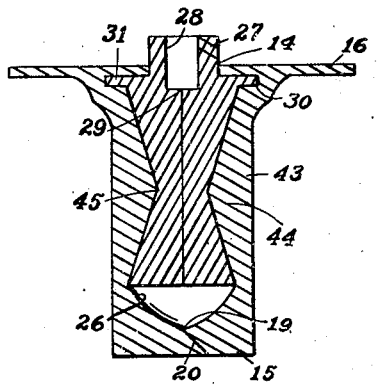
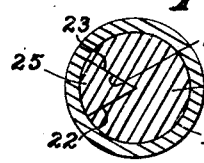
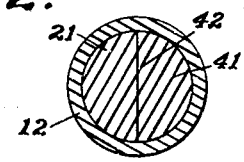
William A. Sonnett
INVENTOR
BY Murray and Zugelter
ATTORNEYS Patented Mar. 20, 1934

1,951,565

UNITED STATES PATENT OFFICE 1,951,565

VALVE

William A. Sonnett, Cincinnati, Ohio

Application June 20, 1932, Serial No. 618,165

10 Claims. (Cl. 273—65)

This invention relates to an inflatable sports ball, particularly to a valve adapted for use with such a ball or with other devices comprising inflatable members.

An object of the invention is to provide a valve of the kind described formed entirely of resilient rubber or similar material.

Another object is to provide such a valve having a plurality of means to prevent leakage of air from the inflated member.

Another object is to provide a valve of this kind permitting of greater facility in filling the inflatable member.

Another object is to provide a valve having novel means precluding separation of its parts.

Another object is to provide an all rubber valve simple and light in construction and adapted for hard and long continued use.

These and other objects are attained by the means described herein and illustrated in the accompanying drawing, in which:

Fig. 1 is a longitudinal cross sectional view of one form of valve of this invention as shown in association with a sports ball, the latter being partially shown.

Fig. 2 is a plan view of the valve and parts seen in Fig. 1, portions being broken away.

Fig. 3 is a view similar to Fig. 1 and showing a tubular inflation and deflation tool adapted for use with the valve of this invention.

Fig. 4 is a cross sectional view taken on line 4—4 of Fig. 1.

Fig. 5 is a longitudinal cross sectional view of a modified form of valve.

Fig. 6 is a view similar to Fig. 4 showing a modified structure.

Fig. 7 is a cross sectional view taken on line 7—7 of Fig. 1.

Fig. 8 is a cross sectional view taken on line 8—8 of Fig. 1.

In sports balls and similar devices, it is desirable to provide an all rubber valve so that the ball will not be rendered poorly balanced by use of metal or partly metal valves and the associated structure necessary to support them. It has been attempted heretofore to provide all-rubber valves for this purpose but for the most part these valves have proved unsatisfactory since their structure has not been sufficient to withstand without leaking, the excessive strains to which balls of this kind, such as footballs and basket-balls, are subjected. This deficiency has been chiefly due to the fact that these valves were provided with only one or two means directed to the prevention of air leakage. Another disadvantage heretofore noted in this connection has been the likelihood of separation of the parts of the valves after a period of use during which the resilient character of the rubber has deteriorated. These and other disadvantages have been overcome by the means of this invention which provides, in brief, for a valve comprising a hollow stem, preferably of irregular shape interiorly, and having a split plug in outline similar to the interior of the stem and disposed in and compressed by the stem. This structure permits the ready insertion of an air tube through the split plug, and the latter is adapted to be tightly compressed into a substantially non-leaking condition by the resiliency of the stem binding its parts together. The insertion of the air tube may be facilitated by moistening the tube. In addition to this anti-leaking structure, this invention provides other means including a positive closure for the inner end of the plug and likewise an air pressure reducing chamber in the stem between the inner ends of the stem and the plug. Furthermore, the plug at its outer end is provided with a substantially solid tip which serves as a further means against air leakage. These means, in combination with the irregular-shaped structure of the plug and stem which preclude separation of the parts, result in a remarkably efficient valve adapted to withstand the hard usage for which sports balls of the kind in question, are intended, and a valve provided with a plurality of novel means all directed to the prevention of air leakage.

With reference to the drawing: The first form of valve shown herein comprises a stem 12 having an irregular hollow interior 13 and formed with an open outer end 14 and a closed inner end 15. The outer end of the valve stem 12 has formed integrally therewith an annular flange 16 extending around said open end. Inwardly of the flange 16 the stem may be somewhat enlarged as indicated at 17. Disposed between the outer end of the stem and the adjacent end of the hollow interior 13, is a shallow annular chamber 30 surrounding the outer end of said interior and in communication therewith and with the open end of the stem. The interior 13 of the stem has the centrally enlarged part 18 and the end portions of the interior are reduced. At its inner end the interior 13 converges to form a narrow channel 19 extending transversely of the stem, Figs. 1, 7 and 8. The inner end 15 of the stem is provided with a slit 20 which may extend at an angle through the stem, as shown, and which at its inner end extends along the bottom line of the channel 19.

A plug 21, of greater diameter through its parts than the interior diameter of the corresponding stem parts, is associated with the stem. Plug 21 is adapted to be disposed in and compressed by stem 12 and is provided with two longitudinally extending cuts 22 and 23, Fig. 4, the lines of which intersect one another and which cuts meet at substantially the middle whereby one section of the plug provides a longitudinally extending channel 24 and the other section 25 of the plug is of complementary wedge shape adapted to fit snugly within the channel 24. The plug terminates short of the inner end of the stem 12 for providing in the stem an air pressure reducing chamber 26 between the inner ends of the plug and stem. The outer end of the plug is formed with a tip 27 which is provided with a restricted longitudinal bore 28, elongated transversely and communicating with the slits of the plug and preferably extending transversely of the directions of said slits so that the communication point between said bore and slits is of restricted rather than elongated shape, as indicated at the point 29, Fig. 1. Between the tip 27 and the plug body, the latter has formed integrally thereon an annular flange 31 which is adapted to be snugly received within the shallow chamber 30 of the stem. The irregular shape of the plug and of the stem interior, the compression of the plug by the stem, and the snug relationship of the plug flange 31 and its chamber, all combine to prevent the normal removal of the plug from the stem.

The valve is adapted to be associated with an inflatable member 32 which is provided with an outer cover 33. The stem and its plug are adapted to project into the inflatable member 32 through a suitable perforation 34 therein, the edges of which are turned inwardly. The flange 16 of the stem is cemented on the outer face of the inflatable member around and covering the perforation 34. Covering and overlapping flange 16, an adhesive patch 35 may be positioned, centrally perforated to receive the plug tip 27. The outer face of said patch is adapted to be suitably cemented to the inner face of a cover lining 36 which may be secured to the cover itself by means of stitching 37. Cover 33 is perforated as at 38 to receive the plug tip 27, and after the parts have been suitably associated, said tip is adapted to be trimmed off into flush relationship with the outer face of cover 33.

The inflatable member is adapted to be inflated and deflated by use of a suitable tool 39 which is adapted to be connected to an air pressure line, and which comprises a rigid tubular portion 40, Fig. 3. Portion 40 is adapted to be inserted through the bore 28 of the plug tip, through the split plug, and finally through the slit 20 of the inner end of the stem, as clearly seen in Fig. 3. In this connection it should be noted that the difficulty heretofore experienced in inserting the air pressure tool, due to the resistance of the rubber, has been substantially eliminated by the split plug structure of this invention. In the form just described, the tubular portion 40 is guided by the channel 24 of the plug. At the inner end of the stem, the converging interior thereof likewise serves to guide the air tube into the bottom of the stem interior and directly into the inner end of the slit 20 so that there is no danger of the air tool being thrust through the solid portions of the stem. After the inflatable member has been air filled, the parts of the stem end 15 adjacent the slit 20 serves as a check valve to preclude the back flow of air outwardly of the valve. However, even though a small quantity of air should pass through the slit 20, the chamber 26 within the stem permits only a very small quantity of air to enter the stem so that air pressure on the inner end of the plug is negligible. The plug itself has its sections tightly compressed by the stem 12 which is of smaller diameter than the plug and, in addition, the wedge shaped section of the plug is tightly seated in the channel part thereof so that air leakage is further rendered difficult. Finally the bore in the tip of the plug and its very reduced communication point with the split of the plug is likewise adapted to preclude back passage of air. A constriction of the ends of the body 21 is accomplished by the thickened wall portions at the ends of the stem 12 as seen in Fig. 1 or by the thickened wall portion intermediate of the stem as seen in Fig. 3. It will be seen from the foregoing, that a plurality of means has been provided for precluding leakage of air from the inflated member.

In Fig. 6 a slightly modified form 41 of the plug is illustrated. Herein the plug is split by a straight transverse cut 42. This construction renders an air tool very readily inserted and by the tight compression of the plug parts and the other means previously described air leakage is practically eliminated.

In the modified form 43 of valve shown in Fig. 5, the interior of the stem is centrally enlarged as indicated at 44 and the body of the plug is centrally reduced in conformity with this shape, as indicated at 45. This structure is equally efficient to preclude accidental removal of the plug from position. It is obvious that either form of split plug may be utilized. It is furthermore obvious that other irregular but complementary forms of stem and plug may be made use of without departing from the spirit of this invention. Other modifications of the various parts of the valve become apparent upon considering the means of the invention but these are believed to be included within its scope.

What is claimed is:

1. A valve for a sport ball or other device provided with an inflatable member, said valve being formed entirely of rubber or similar material and comprising a stem adapted to project into the inflatable member, means for attachment of the stem to said member, said stem being provided with a hollow irregular interior and being formed with an open outer end and a closed inner end provided with a slit extending through the end wall, and a plug having a longitudinally split body of an outline similar to that of the stem interior and a tip at one end of said body and provided with a longitudinal restricted bore communicating with the split of the plug body, said body being disposed in and compressed laterally by the stem and terminating short of the inner end of the stem for providing an air pressure reducing chamber in the stem between said parts and said tip projecting outwardly of the open end of the stem, the inflatable member being adapted to be inflated and deflated by passage of air through a rigid tube inserted through the bore of the tip and the slits of the plug and stem.

2. An all rubber valve for a sport ball or other device provided with an inflatable member, said valve comprising a stem adapted to project into the inflatable member and provided with a centrally enlarged hollow interior, said stem being formed with an open outer end and a closed inner end provided with a slit extending through the end wall, an integral annular flange around the outer end of the stem for attachment to the inflatable member, and a plug having a longitudinally-split body of an outline similar to that of the interior of the stem and a tip at one end of said body and provided with a longitudinal restricted bore communicating with the split of the plug body, said body being disposed in and compressed laterally by the stem and terminating short of the inner end of the stem for providing an air pressure reducing chamber in the stem between said parts, and said tip projecting outwardly of the open end of the stem, the inflatable member being adapted to be inflated and deflated by passage of air through a rigid tube inserted through the bore of the tip and the slits of the plug and stem.

3. A valve for a sport ball or other device provided with an inflatable member, said valve being formed entirely of rubber or similar material and comprising a stem adapted to project into the inflatable member, means for attachment of the stem to said member, said stem being provided with a centrally reduced hollow interior and being formed with an open outer end and a closed inner end provided with a slit extending through the end wall, and a plug having a longitudinally split body of an outline similar to that of the stem interior and a tip at one end of said body and provided with a longitudinal restricted bore communicating with the split of the plug body, said body being disposed in and compressed laterally by the stem and terminating short of the inner end of the stem for providing an air pressure reducing chamber in the stem between said parts, and said tip projecting outwardly of the open end of the stem, the inflatable member being adapted to be inflated and deflated by passage of air through a rigid tube inserted through the bore of the tip and the slits of the plug and stem.

4. An all-rubber valve for a sport ball or other device provided with an inflatable member, said valve comprising a hollow stem adapted to project into the inflatable member and formed with an open outer end and a closed inner end provided with a slit extending through the end wall, means for attaching the stem to the inflatable member, and a plug having a longitudinally-split body disposed in and compressed laterally by the stem and a tip at one end of the body and projecting outwardly of the open end of the stem and provided with a longitudinal restricted bore communicating with the slit of the plug body, said body terminating short of the inner end of the stem for providing an air pressure reducing chamber in the stem between said parts, the inflatable member being inflated or deflated by passage of air through a rigid tube inserted through the bore of the tip and the slits of the plug and stem.

5. A valve for a sport ball or other device provided with an inflatable member, said valve being formed entirely of rubber or similar material and comprising a stem adapted to project into the inflatable member, means for attachment of the stem to said member, said stem being provided with a hollow irregular interior and being formed with an open outer end and a closed inner end provided with a slit extending through the end wall, and a plug having a body similar in outline to that of the stem interior and twice cut longitudinally along intersecting lines for forming one portion of the body channel shaped in cross section and the other portion of complementary wedge shape in cross section, a tip at one end of said body and provided with a longitudinal restricted bore communicating with said cuts at substantially the intersection thereof, said body being disposed in and compressed laterally by the stem and terminating short of the inner end of the stem for providing an air pressure reducing chamber in the stem between said parts and said tip projecting outwardly of the open end of the stem, the inflatable member being adapted to be inflated and deflated by passage of air through a rigid tube inserted through the bore of the tip, the channel of the plug body and the slit inner end of the stem.

6. A valve for a sport ball or other device provided with an inflatable member, said valve being formed entirely of rubber or similar material and comprising a stem adapted to project into the inflatable member, an integral annular flange around the outer end of the stem for attachment to the inflatable member, said stem being formed with a hollow irregular interior, an open outer end and a closed inner end, the interior of the stem at the closed end converging to form a relatively narrow transverse channel and said closed end being provided with a slit extending along the bottom of said channel, said stem being further formed to provide a shallow recess extending transversely of the stem between and communicating with the open end and hollow interior of the stem, and a plug having a longitudinally split body similar in outline to that of the stem interior, a tip at one end of said body and an integral flange at the inner end of the tip, said tip being provided with a longitudinal restricted bore communicating with the split of the plug body, said body being disposed in and compressed laterally by the stem with the tip projecting out of the open end of the stem and the flange on the tip disposed snugly within the shallow recess of the stem, said split body terminating short of the inner end of the stem for providing an air pressure reducing chamber in the stem between said parts, the inflatable member being adapted to be inflated and deflated by passage of air through a rigid tube inserted through the bore of the tip and the slits of the plug and stem, the tube being readily guided into the stem slit by the converging interior at the end of the stem.

7. A valve for a sport ball or other device provided with an inflatable member, said valve being formed entirely of rubber or similar material and comprising a hollow stem adapted to project into the inflatable member and formed with an open outer end and a closed inner end, means for attaching the stem to the inflatable member, and a plug having a body disposed in and compressed by the stem and a tip at one end of said body and projecting from the open end of the stem, said tip, body and closed stem end being adapted to have a rigid inflating tube or the like inserted therethrough for projection into the inflatable member to effect inflation and deflation thereof.

8. A valve for a sport ball or other device provided with an inflatable member, said valve being formed entirely of rubber or similar material and comprising a hollow stem adapted to project into the inflatable member and formed with an open outer end and a closed inner end, means for attaching the stem to the inflatable member, and a plug having a body disposed in and compressed by the stem and a tip at one end of said body and projecting from the open end of the stem, said tip and body being provided each with a longitudinal passage and the closed end of the stem having a slit therein, whereby a rigid tube or the like may be inserted into the inflatable member to effect inflation and deflation thereof.

9. A valve for a sport ball or other device provided with an inflatable member, said valve being formed entirely of rubber or similar material and comprising a hollow stem adapted to project into the inflatable member and formed with an open outer end and a closed inner end, means for attaching the stem to the inflatable member, and a plug having a body disposed in and compressed by the stem and a tip at one end of said body and projecting from the open end of the stem, said tip and body being provided each with a longitudinal passage and the closed end of the stem having a slit therein, whereby a rigid tube or the like may be inserted into the inflatable member to effect inflation and deflation thereof, said plug terminating short of the inner end of the stem for providing an air pressure reducing chamber in the stem between said parts.

10. A valve for a sport ball or other device provided with an inflatable member, said valve being formed entirely of rubber or similar material and comprising a hollow stem adapted to project into the inflatable member and formed with an open outer end and a closed inner end, the latter having a slit therethrough, means for attaching the stem to the inflatable member, and a plug having a longitudinally split body disposed in and compressed by the stem and a tip at one end of said body and projecting from the open end of the stem, said tip having a longitudinal bore communicating with the split of said body, the inflatable member being adapted to be inflated and deflated by passage of air through a rigid tube inserted through the bore of said tip and the slits of said plug and stem.

WILLIAM A. SONNETT.